US010732588B2

(12) United States Patent
Jiang

(10) Patent No.: US 10,732,588 B2
(45) Date of Patent: Aug. 4, 2020

(54) DECENTRALIZED COMPUTING NETWORK SYSTEM AND COMPUTING PROCESSING NODE USED FOR THE SAME

(71) Applicant: LYNKROS TECHNOLOGY (BEIJING) CO., LTD., Beijing (CN)

(72) Inventor: Ziyan Jiang, Beijing (CN)

(73) Assignee: LYNKROS TECHNOLOGY (BEIJING) CO., LTD., Beijing (CN)

( * ) Notice: Subject to any disclaimer, the term of this patent is extended or adjusted under 35 U.S.C. 154(b) by 262 days.

(21) Appl. No.: 15/740,146

(22) PCT Filed: Jun. 1, 2016

(86) PCT No.: PCT/CN2016/084332
§ 371 (c)(1),
(2) Date: Dec. 27, 2017

(87) PCT Pub. No.: WO2017/000738
PCT Pub. Date: Jan. 5, 2017

(65) Prior Publication Data
US 2018/0188702 A1 Jul. 5, 2018

(30) Foreign Application Priority Data

Jun. 30, 2015 (CN) .......................... 2015 1 0377980
Jun. 30, 2015 (CN) .......................... 2015 1 0378076

(51) Int. Cl.
*G05B 15/02* (2006.01)
*G05B 19/05* (2006.01)
(Continued)

(52) U.S. Cl.
CPC .............. *G05B 15/02* (2013.01); *G05B 19/05* (2013.01); *G06F 9/5061* (2013.01); *G06F 9/545* (2013.01); *H04L 41/12* (2013.01); *H04W 84/18* (2013.01)

(58) Field of Classification Search
CPC ...................................................... G05B 15/02
(Continued)

(56) References Cited

U.S. PATENT DOCUMENTS 7,031,945 B1 * 4/2006 Donner ................. G06Q 10/02
705/64
7,656,822 B1 * 2/2010 AbdelAziz .......... H04L 12/4633
370/255

(Continued)

FOREIGN PATENT DOCUMENTS

CN 101102225 A * 1/2008
CN 101102225 A 1/2008
(Continued)

OTHER PUBLICATIONS

Japanese Office Action for Appln. No. 2017-568390 dated Jan. 4, 2019 and English translation, 6 pages.
(Continued)

Primary Examiner — Ondrej C Vostal
(74) Attorney, Agent, or Firm — Carter, DeLuca & Farrell LLP; George Likourezos

(57) ABSTRACT

The present invention discloses a decentralized computing network system and a computing processing node (CPN) for the system. The decentralized computing network system consists of a plurality of CPNs, and each CPN is a computer with information receiving, processing and transmitting functions; each CPN conducts data interaction with its topologically adjacent CPNs; each CPN has a spatial attribute embodied as an absolute spatial position where the CPN is located and/or a relative spatial position of the CPN in a topological network; the decentralized computing network system is built-in with an operating system, and at least a part of operating system is distributed in each CPN; the operating system provides an API interface to convert a management/control demand and/or a strategy into a stan- (Continued)

dard computation sequence, and into an instruction sequence recognizable by the operating system; the computing sequence is jointly completed by the CPNs in the decentralized computing network system in a decentralized and self-organized manner. The system can be applicable to a building automation system, providing an open and flat control platform which is easy to program.

19 Claims, 6 Drawing Sheets

(51) Int. Cl.
  *G06F 9/50* (2006.01)
  *G06F 9/54* (2006.01)
  *H04L 12/24* (2006.01)
  *H04W 84/18* (2009.01)

(58) Field of Classification Search
  USPC .......................................................... 709/243
  See application file for complete search history.

(56) References Cited

U.S. PATENT DOCUMENTS

| | | | | |
|---|---|---|---|---|
| 7,765,307 | B1* | 7/2010 | Kritov | H04L 69/14 |
| | | | | 709/227 |
| 2008/0075020 | A1 | 3/2008 | Hemberger et al. | |
| 2008/0147234 | A1* | 6/2008 | Biegelsen | G05B 19/0421 |
| | | | | 700/224 |
| 2013/0325525 | A1* | 12/2013 | Boyd, Jr. | G06Q 30/0631 |
| | | | | 705/5 |
| 2014/0351010 | A1* | 11/2014 | Kong | G05F 1/66 |
| | | | | 705/7.29 |
| 2015/0148979 | A1 | 5/2015 | Forbes, Jr. | |
| 2016/0057592 | A1* | 2/2016 | Tagg | H04W 84/042 |
| | | | | 455/414.1 |
| 2017/0270157 | A1* | 9/2017 | Porika | G06F 16/2423 |

FOREIGN PATENT DOCUMENTS

| | | | | |
|---|---|---|---|---|
| CN | 201477439 | U * | 5/2010 | |
| CN | 201477439 | U | 5/2010 | |
| CN | 102130950 | A * | 7/2011 | |
| CN | 102130950 | A | 7/2011 | |
| CN | 104620183 | A * | 5/2015 | |
| CN | 104620183 | A | 5/2015 | |
| EP | 1087567 | A2 * | 3/2001 | ............. H04W 8/24 |
| EP | 1087567 | A2 | 3/2001 | |
| JP | S62212763 | A | 9/1987 | |
| JP | H06-28325 | A | 2/1994 | |
| JP | H06301655 | A | 10/1994 | |
| JP | 2004054622 | A | 2/2004 | |
| JP | 2006033384 | A | 2/2006 | |
| JP | 2012120432 | A | 6/2012 | |

OTHER PUBLICATIONS

Extended European Search Report for EP 16 81 7102 dated Jan. 23, 2019, 10 pages.
Ramaswamy, "Connectivity based node clustering in decentralized peer-to-peer networks", Proc. of the Third Intnl. Conf. on Peer-to-Peer Computing, pp. 1-8 (Sep. 2003).
Wior et al., "Control design for nodes in decentralized traffic networks with delayed traffic information", 201 IEEE 18th Conf on Emerging Tech. & Factory Automation (ETFA), IEEE (Sep. 2013), 6 pages.
International Search Report for Chinese PCT Appln. No. PCT/CN2016/084332 dated Sep. 1, 2016.
Japanese Office Action issued for Application No. 2017-568390 dated Jan. 20, 2020 and English translation, 9 pages.

* cited by examiner

DECENTRALIZED COMPUTING NETWORK SYSTEM AND COMPUTING PROCESSING NODE USED FOR THE SAME

This application claims priorities to Chinese patent application No. 201510377980.1 filed on Jun. 30, 2015 and titled "decentralized computing network system" and Chinese patent application No. 201510378076.2 filed on Jun. 30, 2015 and titled "computing processing node used for decentralized computing network", all contents of which are incorporated hereby by reference.

TECHNICAL FIELD

The invention relates to the technical field of computing network, and particularly to a decentralized computing network system and computing processing node used for the same.

BACKGROUND

Since the 1980s, people have started to realize building automation with the help of information technology, for example, broadcast & sound system, IC card management system, hotel room management system, energy monitoring & management system for specific service functions, as well as air-conditioning control system, security system, firefighting system, chiller plant control system, electrical safety system, etc. However, the problem lies in that, the management control system in the prior art is often not so "intelligent", and more than half of building automation systems can only remotely monitor the building environment and the operating parameter of the system equipment in the central control room, and manually stop/start or regulate the operating state of the electromechanical equipment through human-machine interface. Such system is substantially dependent heavily on manual operation of the operator, without achieving automation and intelligence. Only a very few buildings can realize automatic control and management at the building level, including optimal control in sub-systems and integrated control between the sub-systems.

The root cause of this situation lies in the centralized architecture of the automatic control system. As shown in FIG. 1, the automatic control system in the prior art adopts a centralized organizational structure, in which all terminal measuring and controlling points (sensor, actuator, field controller) are connected by a bus communication network. The terminal information measuring and controlling points of the sub-systems (lighting system, air conditioning system, firefighting system, security system) are largely distributed in the same building sub-space, but they are integrated vertically according to different sub-systems. The centralized automatic control system has the following main disadvantages:

1. It is necessary to conduct global communication naming and define physical properties for the terminal measuring and controlling points, and specify correlations between them. When there are a larger number of measuring and controlling points, such field configuration becomes extremely heavy and difficult; this work can be started only after building construction is completed and electromechanical equipments are in place, the construction/commissioning period available is very short, and thus the work is done hurriedly; in later changes of building layout or function partition, the automatic control system is difficult to change flexibly when the building layout or the function partition changes in later time.

2. It is difficult to achieve real information sharing among the sub-systems. A new system will be established on the upper layers of some existing systems in order to achieve cross-system information sharing, and this needs to re-configure and re-define the whole system, which leads to extremely high difficulty and cost and is not adapted to demands on intellectualization, informationzation and front-end of the building control;

3. The automatic control platform is closed and has a poor generality. The control software is often separately designed for individual building, and thus in the process of system transformation and expansion, the new control strategy is difficult to be realized flexibly and simply on the existing automatic control platform.

4. It is difficult to conduct cross-system integration. The existing automatic control system and platform have poor generality and unfriendly software/hardware environment. The developer is required to have higher professional IT knowledge, while various control strategies and control logics (e.g., control strategy of the HVAC system, control strategy of firefighting system, control strategy of security system) operating in the automatic control system are always formulated by the engineers in various fields (HVAC engineer, fire safety engineer, etc.). Therefore, the engineers in various fields are very difficult to convert the formulated control strategies and control logics into the control software of the automatic control system, so that the functions that the sub-systems should realize are very difficult to integrate into the existing automatic control system and automatic control platform.

SUMMARY

The invention is intended to solve at least one of the technical problems in the prior art.

For this purpose, an object of the invention is to provide a decentralized computing network system and computing processing node (CPN) used for the same, which can be applied to the building automation system and provide an open, flat and easy-to-program control platform. It should be noted that, the computing network system and computing processing node (CPN) provided by the invention are generated in and can be applied to the building automation field, but this does not constitute limitation to the protection scope of the invention, and the computing network system of the invention, as a basic computing network, can also be applied to other fields.

To achieve the above object, an embodiment of the invention discloses a computing processing node (CPN) used for a decentralized computing network, which is a computer with information receiving, processing and sending functions. The computing processing node (CPN) has a central processor, a memory and a communication interface; a plurality of the computing processing nodes (CPN) constitute the decentralized computing network; each computing processing node (CPN) conducts data interaction with its topologically adjacent computing processing node (CPN); the computing processing node (CPN) has spatial attribute, which is embodied as an absolute spatial position where the computing processing node (CPN) is located and/or a relative spatial position of the computing processing node (CPN) in the topological network; the computing processing node has an embedded operating system, which provides APIs, and a user can convert various management/control demands and/or strategies into a standard computation sequence through the APIs; the computing processing nodes (CPN) in the decentralized computing network jointly accomplish the computation sequence in a decentralized and self-organized manner.

To achieve the above object, an embodiment of the invention discloses a decentralized computing network system, which consists of a plurality of computing processing nodes (CPN), the computing processing nodes (CPN) being computers with information receiving, processing and sending functions. Each computing processing node (CPN) conducts data interaction with its topologically adjacent computing processing node (CPN); the computing processing node (CPN) has spatial attribute, which is embodied as the absolute spatial position where the computing processing node (CPN) is located and/or the relative spatial position of the computing processing node (CPN) in the topological network; the decentralized computing network system has an embedded operating system, and the operating system or at least one portion of the operating system is distributed in each computing processing node (CPN); the operating system provides API interfaces, and a user can convert various management/control demands and/or strategies into a standard computation sequence through the API interfaces; and the computing processing nodes (CPN) in the decentralized computing network system jointly accomplish the computation sequence in a decentralized and self-organized manner.

The decentralized computing network system and the computing processing node used for the same provided by the invention have the following characteristics:

1. Space-oriented: Each computing processing node (CPN) is associated with a basic space unit or a District Control System of certain electromechanical equipment. When the computing processing node (CPN) is associated with the District Control System, spatial position information, relative position relationship or topological relation of the basic space unit or the electromechanical equipment is naturally embodied on the computing processing node (CPN), thus it has an advantage of rapid deployment, can get rid of massive and repeated field wiring, adaption, debugging and definition work of the traditional control system, and saves a lot of labor;

2. Standardization: All related information of the basic space unit or the electromechanical equipment is depicted in the form of a standard data set, and the computing processing node can automatically identify whether the associated one is the basic space unit or certain electromechanical equipment after the computing processing node is associated with the District Control System, thus the computing processing node (CPN) can be used once inserted, and identified automatically.

3. Decentralized computing: The entire computing network system is flat and decentralized; all nodes are entirely equal; global computation is completed by data interaction among the nodes in a distributed manner; various management control strategies operating on the system are reflected and completed by the decentralized computation;

4. Rapid and friendly programming environment: The system provides an open and user-friendly humanized programming platform. The user can easily complete event/task definition by virtue of an operator/algorithm library provided by the system, and then the system can automatically compile a bottom program code, thereby realizing rapid software coding of the control management strategy, and having an advantage of agile development; furthermore, humongous application programs can be developed on the programming platform, with great compatibility and flexibility.

BRIEF DESCRIPTION OF THE DRAWINGS

The above and/or additional aspects and advantages of the invention will be clear and easy to understand through the description of embodiments in conjunction with the following drawings, wherein.

DETAILED DESCRIPTION

The basic structure of the decentralized computing network system according to an embodiment of the invention is shown below.

Figure 1:
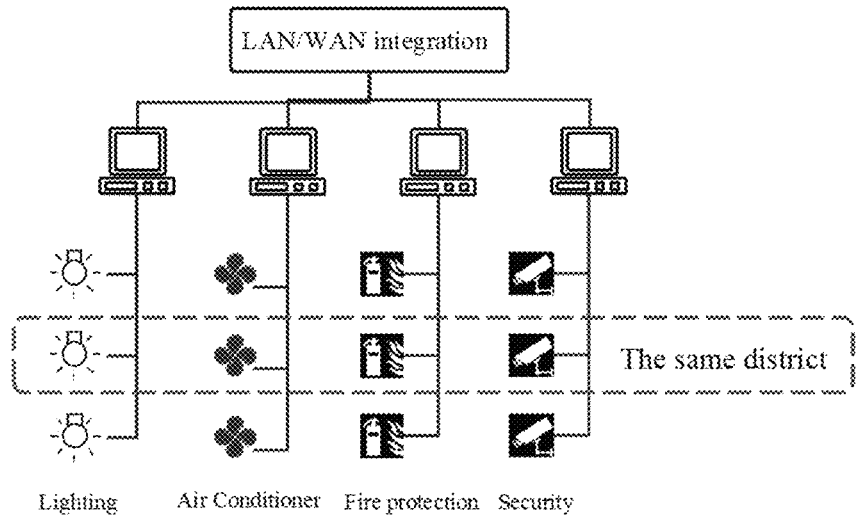
FIG. 1 is an organization chart of the central control system in the prior art.
Figure 2:
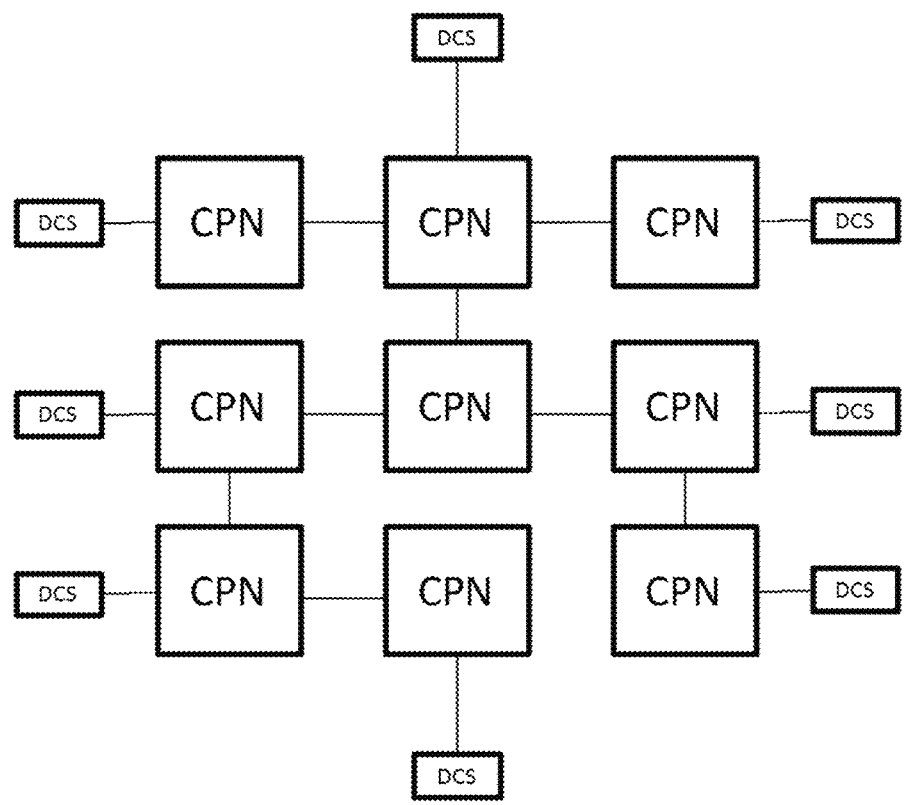
FIG. 2 is a structure diagram of the decentralized computing network system according to an embodiment of the invention.

As shown in FIG. 2, it depicts a structure of the decentralized computing network system according to an embodiment of the invention. The computing network may consist of computing processing nodes (CPN). All of the computing processing nodes together compose a flat and decentralized computing network, and each of the computing processing nodes is equal.

Figure 5:
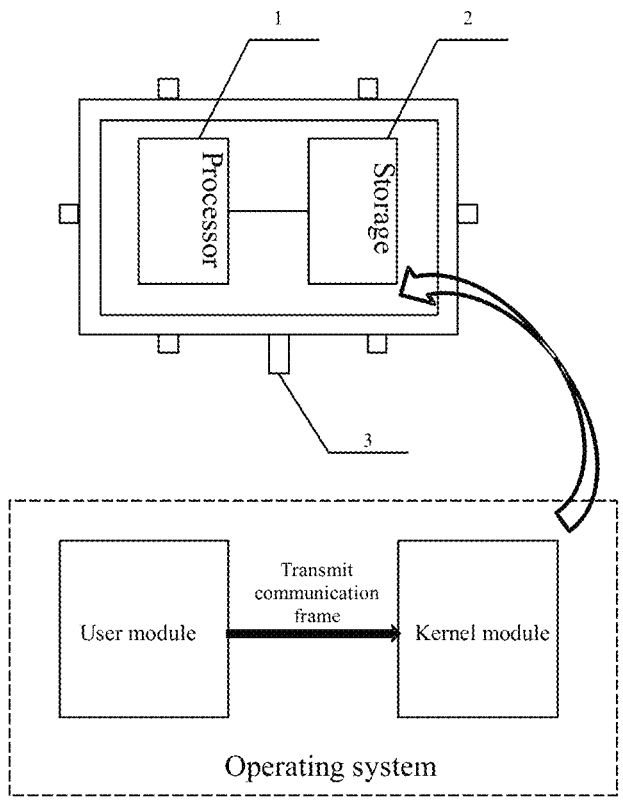
FIG. 5 is a structure diagram of the computing processing node (CPN) according to an embodiment of the invention.

The computing processing node is a computer (e.g., a small size computer) with information receiving, processing and sending functions. The structure and composition of the computing processing node are as shown in FIG. 5, wherein each computing processing node has a processor 1, a memory 2 and a communication interface 3.

Each computing processing node conducts data interaction with a topologically adjacent computing processing node, and the data interaction is one-hop communication; then the computing processing node conducts data interaction with the topologically adjacent computing processing node after information processing, and the data interaction is also one-hop communication; all computing processing nodes jointly accomplish the computing task in a decentralized manner; that it to say, the decentralized computing network provided by the invention decomposes the task into typical and reproducible basic computations, while the basic computations is completed by each computing processing node through acquiring input information from adjacent nodes, completing local computation and then transmitting the computation result to the adjacent nodes. There is no concept of a center or head in the whole network, and computation of the system is completed among nodes by a self-organized coordination mechanism.

The computing processing node (CPN) has a spatial attribute embodied as an absolute spatial position where the computing processing node (CPN) is located and/or a relative spatial position of the computing processing node (CPN) in the topological network.

Combining FIG. 5 again, an operating system is built in the distributed computing network system, and the operating system comprises a kernel module and a user module. The kernel module of the operating system is distributed at each computing processing node, and the kernel module in each computing processing node is completely the same.

It can thus be seen that, the network formed by interconnecting the computing processing nodes (CPN) constitutes a large computer, and the computing process is distributed in each computing processing node (CPN); single computing processing node itself may also be a computer with comprehensive information processing and operating computation capability, but the capacity of processing information and computation is weak. The system formed by interconnecting multiple computing processing nodes has stronger information storage, computation and communication capabilities.

There are cache modules in the memory of the CPN, which are used for storing the states of tasks and/or events. The number of the cache modules may be 1024 or be any. The system can process in parallel multiple tasks or events at the same time and can adapt to the complex and varied requirements of control tasks.

Figure 9:
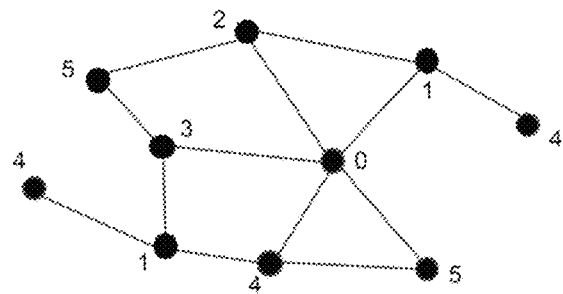
FIG. 9 is a schematic diagram of the topological and naming rules of the decentralized computing network system according to an embodiment of the invention.

With reference to FIG. 9, a localized naming mode is adopted for each CPN when accessing the network, i.e., the naming of each CPN needs only to distinguish from adjacent nodes without global naming or configuring via route. As shown in FIG. 9, the nodes named by 1, 4 or 5 occur for many times in the network, but the normal operation of the computing network is not affected. Each CPN can directly and only conduct data interaction with directly adjacent computing processing node on its topology, and different names of the adjacent nodes are therefore required only, which may effectively avoid massive field naming and system configuration.

Each CPN is provided with several communication interfaces (i.e., API) which are divided into type A and type B. The computing processing node is interconnected with its topologically adjacent computing processing nodes via the type A communication interface and interconnected with District Control System (DCS) via the type B communication interface. The District Control System is associated with a certain basic space unit (e.g., a subspace of a building: an office of a corridor, etc.) or a certain electromechanical equipment (e.g., a refrigerator, a pump, etc.). The District Control System is configured to collect all measurement and control information of the subspace or the electromechanical equipment or configured to control controllers or actuators associated with the subspace or the electromechanical equipment. Information interaction between the CPN and corresponding DCS is achieved according to the standard information set, and thus the related information required for calculation may be acquired from the DCS or the calculation results may be sent to the corresponding DCS for performing related control.

Figure 3:
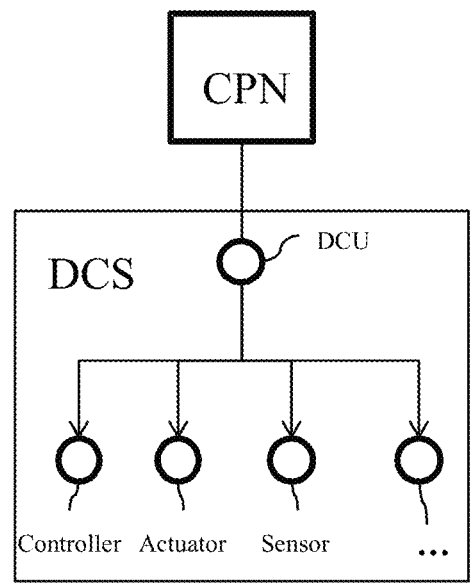
FIG. 3 is a schematic diagram of the first realization way of communication between the computing processing node and DCS system according to an embodiment of the invention.

The communication modes between CPN and DCS include but are not limited to the two modes below:

The first mode, as shown in FIG. 3:

The computing processing node directly performs data interaction with a district control unit (DCU) in the DCS, and the DCU then performs data interaction with controllers, sensors or actuators, wherein the DCU forms a master-slave relationship with the controllers, the sensors or the actuators.

Figure 4:
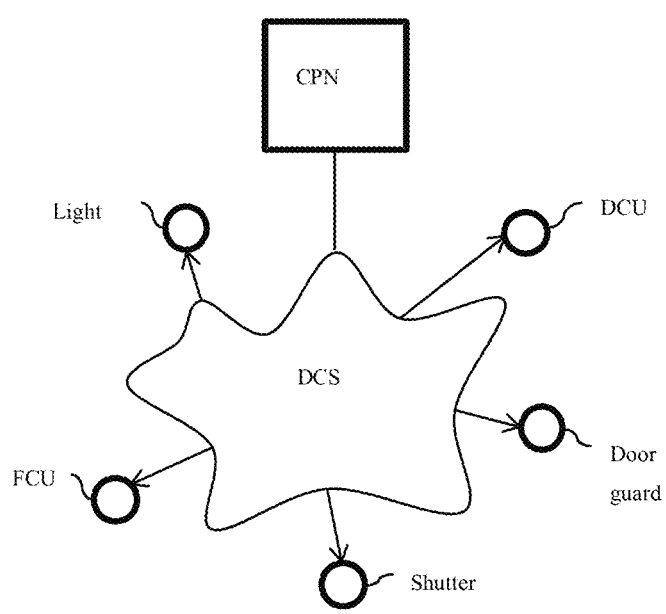
FIG. 4 is a schematic diagram of another realization way of communication between the computing processing node and DCS system according to an embodiment of the invention.

The second mode, as shown in FIG. 4:

The DCU in the DCS and the controllers, the sensors, the actuators or intelligent devices such as lightings, shutters or FCU are located on a local network system (which can be a local area network). The computing processing node is interconnected with the local network system, and information interaction can be performed among the CPN, the DCU and the controllers, the sensors, the actuators or the intelligent devices such as the lightings, the shutters or the FCU. There is no master-slave relationship among the components mentioned above.

Multiple communication protocols are supported for the communication modes between the CPN and the DCS, so that the CPN can be compatible with all kinds of DCU products in the prior art.

Furthermore, the function of the DCU can be integrated into the CPN, that is, a module equivalent to the DCU can be added into the CPN. The module corresponds to the subspace of the building or the electromechanical equipment, and collects relevant information or performs relevant control.

Topological relation and functional subnet:

The network formed by the interconnected CPNs is a physically tangible network, on which multiple virtual functional subnets can be defined, such as indoor traffic network, air flow network, heat transfer network, power distribution system, air-conditioning water system, water system, domestic hot water system, air conditioning duct system, ventilation system, fresh air system, gas supply system, chiller plant, heating plant and the like. Calculation can be conducted within individual functional subnet and correlation calculation of multiple functional subnets can be conducted as well, therefore, the information sharing in the multiple subnets can be achieved naturally.

The functional subnet is determined by the specifically applied content, is a virtual net on the decentralized computing network provided by the invention, and has a topological structure being the same as that of the physical network.

Since a plurality of virtual subnets can be defined on the computing network of the invention, the same CPN may be subordinate to multiple functional subnets, and the functional subnets do not affect mutually, thus the computing processing nodes can handle the computing tasks of the functional subnets simultaneously and in parallel.

Due to the different application functions, each CPN functions differently in the functional subnets, for example, the CPNs of all space units are equal in the air flow subnet while the CPN of the air handling unit (AHU) in the AHU air system constitutes a master-slave relation with the CPN of the subordinate space.

Thus, the system configuration is naturally finished by defining functional subnets on the distributed computing network provided by the invention, and control and management tasks required for the functional subnets are completed by further defining calculation procedures through functional subnets and running the procedures on the subnets.

Terms definition:

The meanings of the terms involved in the computing network system provided by the invention are shown as follows:

Standard computation sequence: A user may transform demands and tasks of all control management into a standard computation sequence via the API interface in the operating system provided by the decentralized computing network.

The computation sequence includes a plurality of computation units, and the computation unit is a task or event. Therefore, the definition of the standard computation sequence includes the followings:

a logical flow chart among the plurality of computation units;

an operator and/or an algorithm, an input variable, an output variable, and a computation flow and/or a step involved by each computation unit.

The following details the definition of a task and an event.

Task: a control management strategy completed collaboratively by a plurality of CPNs, which is constituted by several events according to a certain sequence.

Event: a decentralized computing completed by the CPN, which is determined by defining an operator/an algorithm, an input variable, an output variable and an intermediate variable.

Variable: physical information related to the basic space unit and/or the electromechanical equipment, and/or temporary variable defined by the user, such as, district area in the basic information of the district, room temperature in environment and system measurement parameters, feedback on the on-off state of the lighting equipment in the operating parameters of smart device, the set value of the operating state of the fan coil unit in district, set value of indoor ambient temperature, the fault alarm of fire-fighting equipment, and the grand average power of district within the past 10 minutes.

Algorithm: an operator (the subordinate concept of algorithm), a basic algorithm and an advanced algorithm provided by system or a user-defined algorithm; supporting a user to download an algorithm to CPN and supporting a system to transmit an algorithm to the related CPNs with a mechanism similar to the transmission computing; being able to delete the user-defined algorithm by defining the valid range and/or time of the algorithm.

Further explanation of the above concepts will be made below in combination with specific examples.

Standard information set: why CPN can self-identify, and plug and play.

Figure 11:
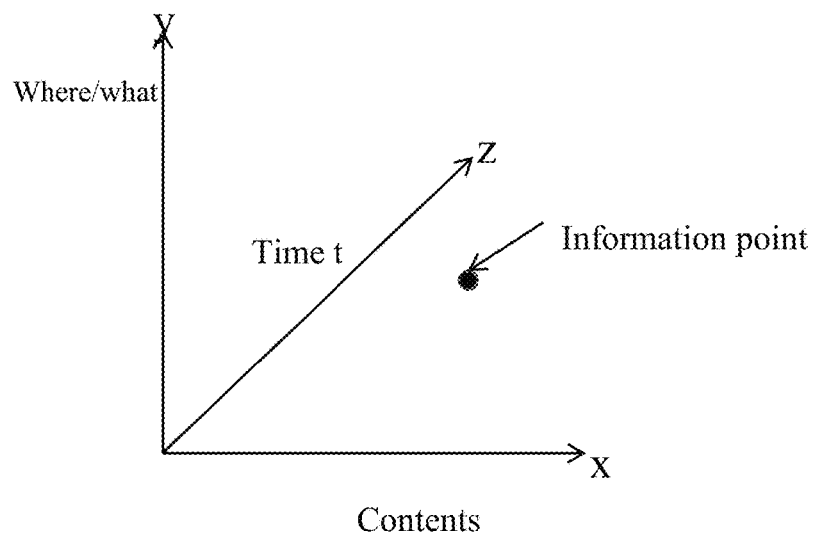
FIG. 11 is a principle diagram of representing information in three dimensions.

Each information point involved in the operation of management control strategies has information of three dimensions generally. As shown in FIG. 11, the first dimension solves the problems of where/what it is, i.e., where the point of information is (including the space, location, being close to trunk or branch and other information with spatial attribute) and what it is (a room, pump or refrigerator); the second dimension focuses on the specific meaning represented by the transmitted data of the information point; and the third dimension means the change of data over time.

Through the decentralized computing network system provided by the invention, at the moment of the combination or communication between CPN and DCS, the spatial attribute of the DCS itself (DCS is a basic space unit (a room or a corridor) or an electromechanical equipment, both of which naturally have position or spatial attribute) naturally maps in CPN, then the network formed after CPNs networking forms an internet of things with spatial attribute, thus, solving the characterization of the first dimension.

The characterization of the second dimension is realized through data standardization:

A standard information set, which consists of a plurality of standard data sheets, is formed through the standardized processing of all points of information involved in the basic space unit or electromechanical equipment. Each basic space unit or electromechanical equipment corresponds to one standard data sheet (as shown in Table 1) which defines the variable and the title and standard format of the variable needed to be acquired, then, all basic space units or electromechanical equipments are described according to the unified standard information set, thus CPN can acquire the information of corresponding district or equipment after interacting data with DCS. For example, the No. 5 data in the standard information set is the "room air temperature", and if the equipment connected with DCS is provided with a temperature sensor placement, then the No. 5 data in the DCS database corresponds to the measured value of the sensor, mapping to the No. 5 data in the CPN database; if there's no measuring point at the bottom, the No. 5 data in the DCS database is in default value state, remaining in default when mapping to the No. 5 data in the CPN database. Even the measuring and control point is changed, such as equipment replacement and increase or decrease of points, no impact will be imposed on CPN as long as the standard data sheet remains unchanged. In this form, CPN can acquire information from DCS regardless of the equipment and communication protocol applied at the bottom; CPN can identify whether it is an architectural space or certain electromechanical equipment (such as refrigerator or pump) through information interaction after connecting with the site DCS, achieving the plug and play and automatic identification of CPN.

Table 1 is an example of the standard data sheet.

TABLE 1

| Variable title | Physical parameter | Type of variable |
|---|---|---|
| Basic district information | | |
| 0X0006 | District area | |
| Environmental and system measurement parameter | | |
| 0X0010 | Room temperature | |
| Operating parameter and state feedback of intelligent equipment | | |
| 0X0020 | On-off state feedback of lighting equipment | |
| Environmental operating parameter and set value of operating state of intelligent equipment | | |
| 0X00B1 | Set value of operating state of fan coil unit 1 within district | |
| 0X00D1 | Set value of indoor ambient temperature | |
| Fault alarm | | |
| 0X0134 | Fault alarm of fire-fighting equipment | |

TABLE 1-continued

| Variable title | Physical parameter | Type of variable |
|---|---|---|
| | Related to energy consumption | |
| 0X0140 | Total average power in district in the past 10 minutes | |
| 0XFxxx | User-defined function | |

The characterization of the third dimension is realized through the record storage function of DCS or CPN, and the function can record the change and development of the information point over time. Details are not described herein again.

It can be seen that the computing processing node in the decentralized computing network system provided by the invention can plug and play and intelligently identify with strong robustness and flexibility.

Figure 6:
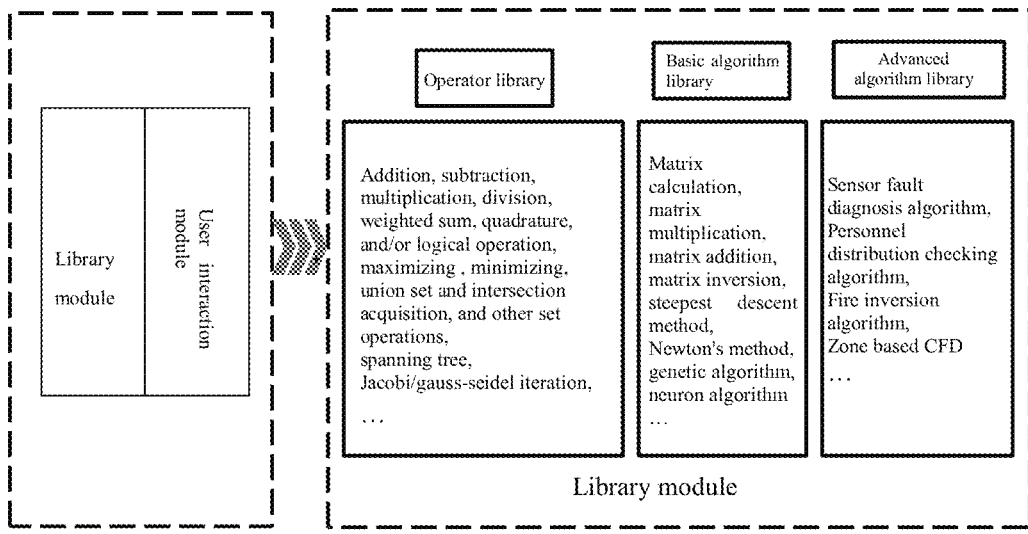
FIG. 6 is a schematic diagram of the library module of the user module of the operating system according to an embodiment of the invention.

Description of user module:

The user module is a kind of API based on communication protocol. The API includes library module and user interaction module, i.e., the operating system provides algorithm libraries at all levels from simple mathematical calculation to professional application algorithm, the user can invoke an algorithm in the algorithm libraries while writing standard computation sequence, and the operating system automatically forms a bottom program code to realize agile programming. Combining with FIG. 6, the library module has built-in three levels of operator/algorithm library, which are operator library, basic algorithm library and advanced algorithm library.

The operator library includes but is not limited to: addition, subtraction, multiplication, division, weighted sum, quadrature, logical operation (and, or and non, etc.), maximizing, minimizing, set operation (intersection, union, etc.), spanning tree, Jacobi/gauss-seidel iteration, and other common basic mathematical operations.

The basic algorithm library includes but is not limited to: matrix calculation algorithm, steepest descent method, Newton's method, genetic algorithm, neuron algorithm, and other common basic mathematical algorithms.

The advanced algorithm library includes but is not limited to: sensor fault diagnosis algorithm, personnel distribution checking algorithm, fire inversion algorithm, region-based CFD algorithm, and other advanced algorithms applied to various professional fields.

Figure 7:
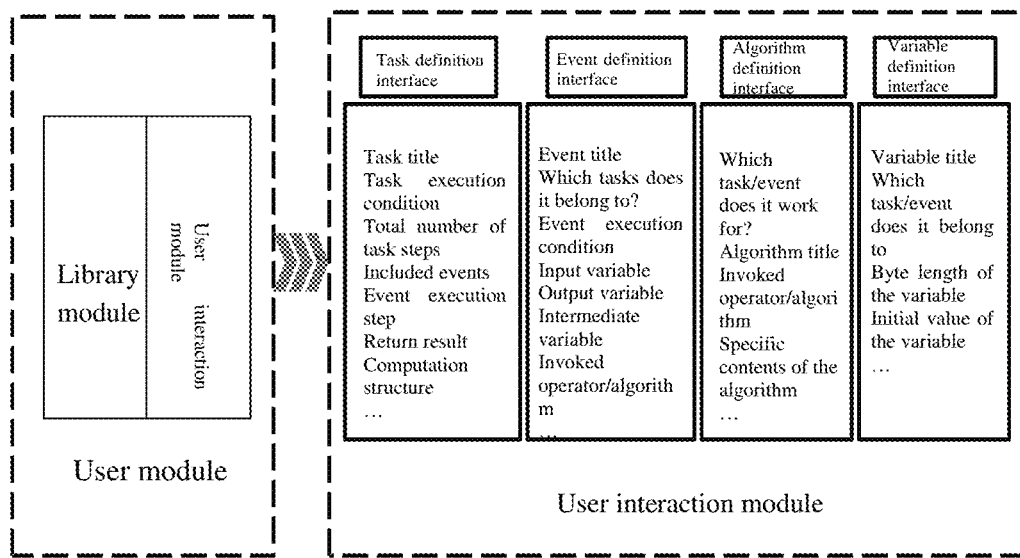
FIG. 7 is a schematic diagram of the user interaction module of the user module of the operating system according to an embodiment of the invention.

Combining with FIG. 7, the user interaction module provides the user with following interfaces: task definition interface, event definition interface, algorithm definition interface and variable definition interface;

Under the task definition interface, users can define one or several of the following items: task name, task execution condition, total number of task steps, event and its execution steps included in the task, computation structure included in the return result of the task.

Under the event definition interface, users can define one or several of the following items: name of the event, the event affiliating to which task, executive conditions of the event, input variable of the event, output variable, name of intermediate variable, called operator/algorithm of the event.

Under the algorithm definition interface, users can define one or several of following items: algorithm acting on which task/event, name of algorithm, concrete contents of algorithm;

Under the variable definition interface, users can define one or several of following items: name of variable, variable affiliating to which task and/or event, byte length of variable, initial value of variable.

It can be understandable that the above examples are only for illustrations. There is no end and it is impossible to list all of them.

The user module can take computing processing node as a carrier, district control system as a carrier and also other independent software and hardware as a carrier. The setting pattern is flexible.

Figure 8:
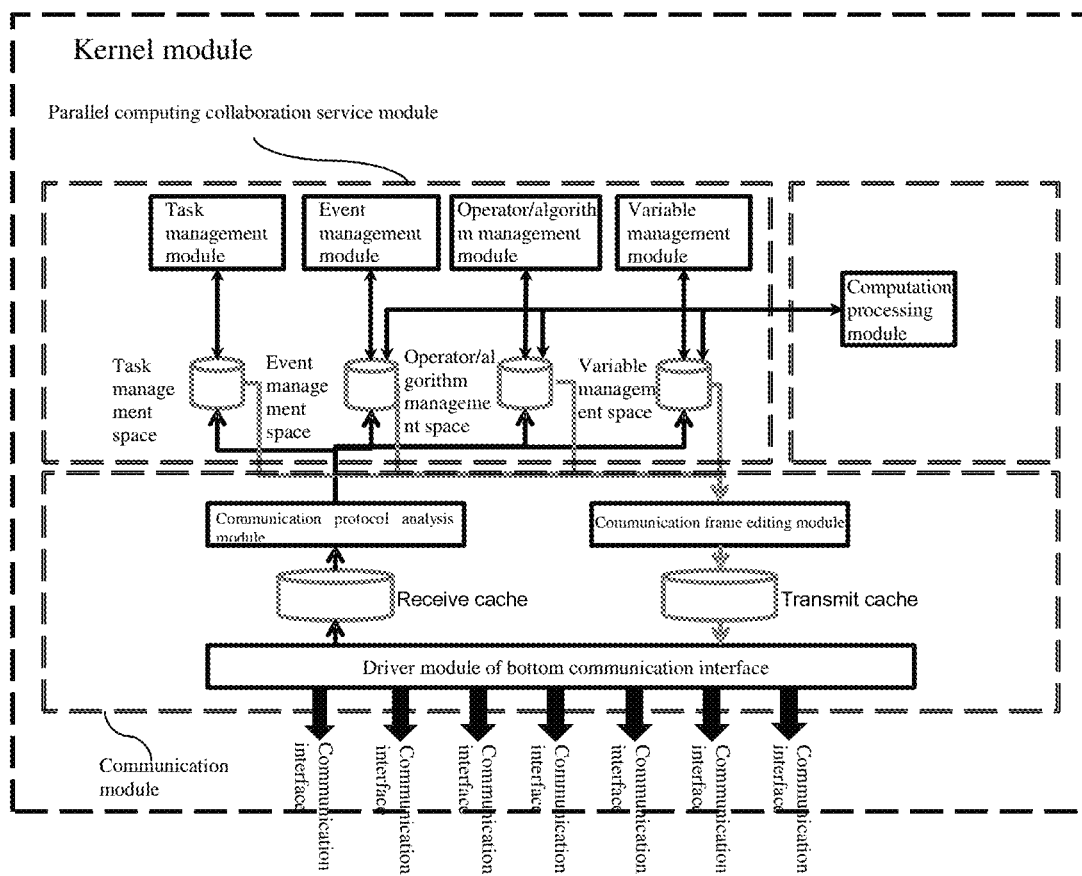
FIG. 8 is a schematic diagram of the kernel module of the operating system according to an embodiment of the invention.

The description of the kernel module:

In combination of FIG. 8: the kernel module further includes:

Computing processing module: used to carry out a basic algorithm;

Parallel computing collaboration service module: used to support and serve parallel computing; making the system compute several computation sequences in parallel.

Communication module: used to achieve the communication task.

The parallel computing collaboration service module further includes following submodules: task management module, event management module, operator/algorithm management module and variable management module.

The communication module further includes following submodules: driver module of communication interface, parsing module of communication protocol and editing module of communication frame.

Collaborative relations among modules are as follows:

The driver module of communication interface accepts information from communication interface and stores it in receive buffers, which is located in the memory of the computing processing node (CPN).

The parsing module of communication protocol takes information out of receive buffer and after analytical process, the information is processed as such four subclasses as task-relevant information, event-relevant information, operator/algorithm-relevant information, variable-relevant information and the processed information in accordance with subclasses is stored in task management space, event management space, operator/algorithm management space and variable management space respectively. The task management space, event management space, operator/algorithm management space and variable management space are located in the memory of computing processing node (CPN).

The task management module manages and maintains the relevant information of the task in the task management space.

The event management module manages and maintains the relevant information of the event in the event management space.

The operator/algorithm management module manages and maintains the relevant information of the operator/algorithm in the operator/algorithm management space.

The variable management module manages and maintains the relevant information of the variable in the variable management space.

The computing processing module takes relevant information out of task management space, event management space, operator/algorithm management space and variable management space for calculation. Then the computed outcomes are stored in task management space, event management space, operator/algorithm management space and variable management space by category respectively.

The editing module of communication frame takes information out of task management space, event management space, operator/algorithm management space and variable management space and edits it into communication frame, which will be stored in transmit buffer located in the memory of computing processing node.

The driver module of communication interface sends out frame in transmit buffer via communication interface.

Figure 10:
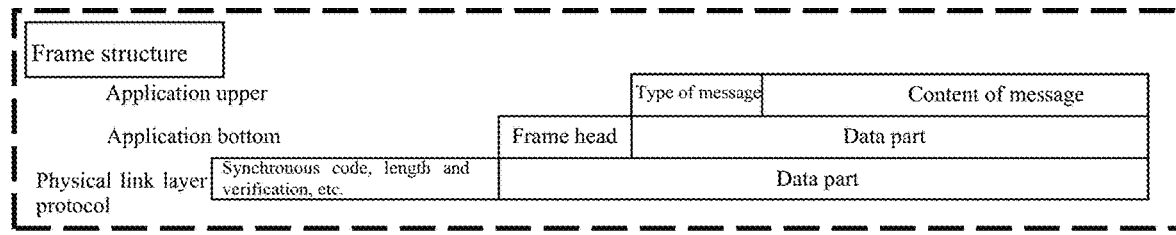
FIG. 10 is a structure diagram of a communication frame between the user module and the kernel module according to an embodiment of the invention.

The communication between the kernel module and the user module:

The kernel module interacts with the user module in terms of information under some communication protocol. It can be any communication protocol existing in the prior art or user-defined communication protocol. For example, in combination of FIG. 10 as it shows, the communication frame that the user module sends to the kernel module can adopt three layers of structure. The bottom is physical link layer protocol, including synchronous code, length, checking and data. This physical link layer can use all kinds of mature communication technology such as Ethernet, Wifi, Zigbee, etc.; the second layer is the bottom of application, including the start of frame and data, which are used to cope with such communication problems as communication response, checking and patch transmission; the third layer is the upper of application, including message type and message content. Message content is used to cope with problems, such as task definition, event definition, algorithm downloading, variable assignment and system upgrade. The structure of application layer can apply other methods. The user module makes use of the form of communication frame as FIG. 10 shows and sends one or several forms of task, event, algorithm, and variable well defined by users to the kernel module.

The explanation of examples:

Operation management tasks and strategies on the decentralized computing network system provided by the invention are reflected and completed by the computation sequence. After the network completes the computation sequence, the task and the strategy of operation management are completed basically. Next, an example will be applied to introduce how computing processing node of the system collaborates with one another to complete distributed computation.

Figure 12:
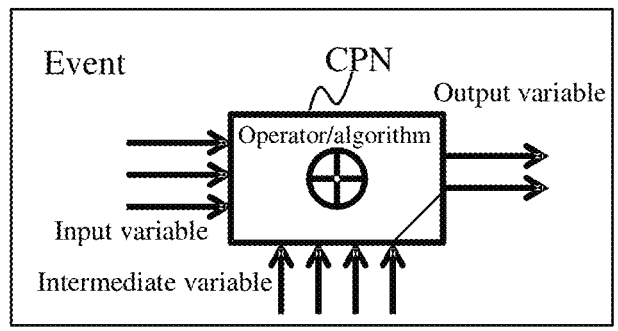
FIG. 12 is a composition diagram of one event according to an embodiment of the invention.

Standard computation sequence is comprised of a number of computing units, which refer to tasks or events. However, task is comprised of a number of events in accordance with sequence; event is a basic algorithm completed by a computing processing node. It is defined through input variable, output variable, intermediate variable (there might be none in some cases) and operator/algorithm as FIG. 12 shows.

EXAMPLE 1

Auto optimization for the set value of pump pressure difference:

The description of problem: the chilled water pump of chilled water system in building HVAC system operates and adjusts in accordance with cooling conditions of the terminals on condition that the requirement of cooling demand for each terminal is met. The set value of chilled water pump pressure difference decreases as possible to minimize the energy consumption of the pump.

Figure 13:
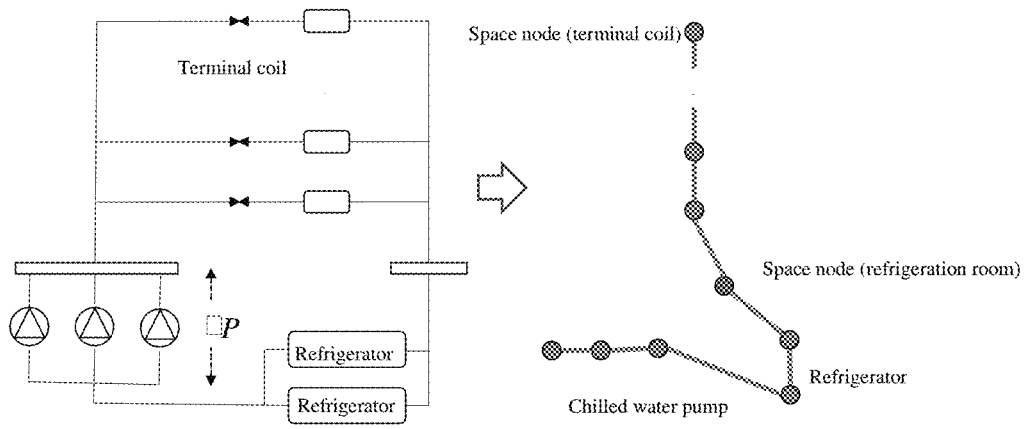
FIG. 13 is a schematic diagram of an example 1 according to an embodiment of the invention.

The structure of network: As FIG. 13 shows, the left part of the figure shows chilled water system control network. In the figure, the terminal of the water system is the network for several branches, simply shown with a riser branch. Corresponding space node network is multidimensional network structure, which is simply shown with a chain-like structure.

The chilled water system applies primary pump system, with 2 refrigerators corresponding to 3 chilled water pumps. The chilled water flows to coils of each room at the terminal via the water separator. The refrigerator and pump separately correspond to a computing processing node of equipment type. The terminal coil belongs to a computing processing node of space type. A computing processing node of space type is set up in the refrigerating machine room where refrigerator is located. The described computing processing nodes interconnect to form a functional subnet, whose structure of topology is shown in the right side of FIG. 13.

Control logic: If there is not enough water in the terminal equipment, the set value of pressure difference is increased according to the number of the terminals that do not meet the requirement, and increase the pump speed or turn on more pump. When all terminals meet the requirements, if the water amount is too large, the set value of pressure difference is reduced to reduce the pump speed or turn off the pump.

The whole problem can be broken down into two relatively independent control loops. One is to adjust the set value of pressure difference at both ends of the chilled water pump according to the terminal demand. The other is that the pump set adjusts the number and frequencies of operating pumps, according to the set value of pressure difference, to minimize the pump energy consumption. Here the first control loop,—namely, how to determine the set value of pressure difference, is related to introduce the calculation process of computing network system provided by the present invention.

Computational process:

The automatic adjustment of the set value of pump pressure difference is completed by three events. As shown in Table 2, events 1 and 2 can be computed in parallel and the result of events 1 and 2 is entered as input of event 3. The whole process is one-way, without cycles, and executes every once in a while (for example, 5 minutes).

TABLE 2

| Step | Event | Operator | Algorithm | Input variable | Output variable |
| --- | --- | --- | --- | --- | --- |
| 1 | Event 1 | Summation | Spanning tree method | Whether local is "too hot" | The total number of "too hot" in terminals |
|  | Event 2 | Summation | Spanning tree method | Whether local is "too cold" | The total number of "too cold" in terminals |
| 2 | Event 3 | User-defined | User-defined | The total number of "too hot" in terminals The total number of "too cold" in terminals The present set value of pressure difference | The new set value of pressure difference |

The specific procedure comprises the following steps:

1. The space node governing each terminal coil judges whether the demand for cooling in this district is sufficient according to the change of the temperature in the district, with basic logic as follows: When the current measured temperature in the district lies in the controlled accuracy range of the temperature set value, and the valve opening (or duty cycle) of the coil in the district is not fully closed, it is believed that the current cooling capacity can meet the demand; when the current measured temperature in the district exceeds the controlled accuracy range of the temperature set value, and the valve opening or duty cycle of the coil in the district is completely opened or lies within a very high threshold value, it is believed that the current cooling capacity cannot meet the demand, and a signal of "too hot" will be sent; when the current measured temperature in the district is lower than the controlled accuracy range of the temperature set value, and the valve opening or duty cycle of the coil in the district is closed fully or lies within a very low threshold value, it is believed that the current cooling capacity exceeds the actual demand for cooling capacity, and a signal of "too cold" will be sent; two variables can be defined, which are variable 1 "whether too hot" (assigning 1 for yes and 0 for no) and variable 2 "whether too cold" (assigning 1 for yes and 0 for no).

2. The space nodes jointly form a spanning tree. From the first computing processing node, the value of variable 1 or 2 is passed to the adjacent node, and such adjacent node conducts "local summation" using the passed figure and local data, and passes the result to next node. So repeatedly, the summation of all nodes is finished when the passing process goes to the end node. In the whole process, all nodes are involved in the summation, but no single node knows exactly how many nodes are there in the entire system. The event 1 (whether too hot) and event 2 (whether too cold) can be subject to parallel computing.

3. After the calculation of events 1 and 2, the result of the above events will be sent to any one of the computing processing nodes (can be the computing processing node for the chilled water pump), and this computing processing node will compute the new pressure difference set value according to the following algorithm, i.e., event 3.

Figure 14:
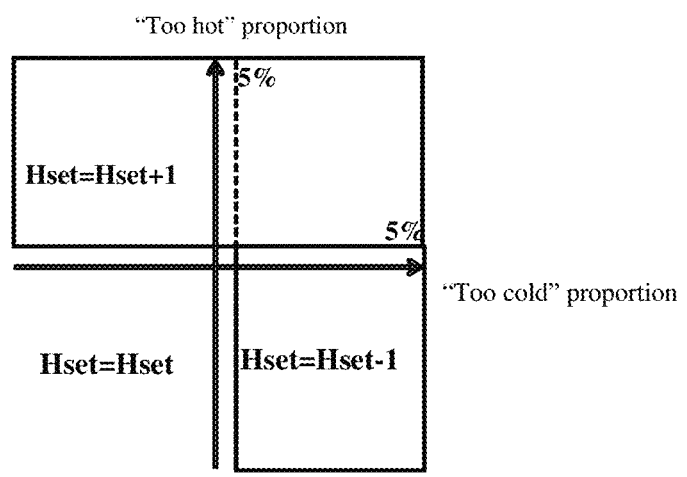
FIG. 14 is another schematic diagram of the example 1 according to an embodiment of the invention.

Combining with FIG. 14, if the ratio of "too hot" of the terminals exceeds 5%, then, new pressure difference set value=original pressure difference set value+1; if the ratio of "too hot" of the terminals is lower than or equal to 5% while that of "too cold" exceeds 5%, then, new pressure difference set value=original pressure difference set value −1; if both ratios of "too cold" and "too hot" are lower than or equal to 5%, then, the pressure difference set value remains unchanged.

In this example, the variable "whether too cold" or "whether too hot" can be a system variable provided by the computing network system or a self-defined variable when user compiles a program. The "local summation" is a basic operator provided by the library module in the user module, which can be built in each computing processing node, and user can directly invoke it without compiling a code. The algorithm of "spanning tree" is provided by computing network and can be directly invoked. The specific input variable, output variable and sequencing of the above events 1, 2 and 3 can be compiled by user.

EXAMPLE 2

Statistics of personnel distribution:

Based on the computing network system provided by the invention, the personnel distribution in each district can be counted as well. With an infrared detector installed at the gate of the district connected with space, when someone leaves district A and enters district B, a signal of subtracting 1 from the number of people from the infrared detector will be sent to the computing processing node in district A, then the computing processing node of district A will subtract 1 from the number of people in the district and send a calculation to the computing processing node in the adjacent district B, adding 1 to the number of people in district B. Therefore, a physical process (corresponding to the actual process) that personnel enter district B from district A is finished on the system via simulation.

All infrared detectors installed at the junction of interconnected districts will detect the personnel transfer in building in real time and send signal to the computing processing nodes of corresponding districts, triggering the real-time computation of the whole system, thus, the distribution of the number of people in all districts can be obtained. This information can serve as the basic information to realize the optimal control over other functional subsystems (such as air conditioning system and lighting system).

EXAMPLE 3

Acquisition of energy consumption values in all rooms:

The energy consumption of the electromechanical equipment of the system can be recorded via DCS or CPN. Or, DCS or CPN calculates the energy consumption of the equipment according to the running time of the equipment, therefore, the energy consumption values of the equipment in each basic space unit can be counted through the system. Property managers have the demand to collect energy consumption values of all areas for comparison and analysis.

From the perspective of mathematical operation, it is a process of globally acquiring a union set to collect energy consumption values of all rooms in essence. During the practical calculation, a computing processing node (CPN) accessed by the property managers initiates an energy consumption statistics task to globally acquire the union set. A variable operated by the CPN is a total energy consumption value of equipment involved of each basic space unit. After the task is initiated, the CPN of the initiated task is spread globally to form a spanning tree in an entire network system, and then the energy consumption value of an terminal node of each branch is returned to neighboring nodes thereof; after receiving the energy consumption values delivered by neighbors, each CPN adds the energy consumption value of a corresponding region thereof for repacking and then transmits to other neighbors (i.e. except for the inputting neighboring node); each CPN in the computing network system conforms to this principle, and finally energy consumption inflammation of all nodes is packed and transmitted to the CPN of the task initiator, i.e. the task of globally acquiring the union set and collecting the energy consumption values of all basic space units are completed.

The computing processing node (CPN) for the decentralized computing network system provided by the present invention has the characteristics as follows:

1. Space oriented: Each computing processing node (CPN) is correlated with one basic space unit or district control system of some electromechanical equipment. When the computing processing node (CPN) is correlated with the district control system, the spatial position information, relative position relation or topological relation of the basic space unit or electromechanical equipment is naturally embodied on the computing processing node (CPN), thus it has the advantages of rapid deployment, can significantly simplifies massive and repeated field wiring, adaption, debugging and definition work of the original control system, and save a lot of labor;

2. Standardization: All related information of the basic space unit or the electromechanical equipment is depicted in the form of a standard information set, and the computing processing node can automatically identify whether the correlated one is the basic space unit or some electromechanical equipment after the computing processing node is correlated with the district, thus the computing processing node (CPN) can be used once inserted, and identified automatically.

3. Decentralized computing: The entire computing network system constituted by the CPNs for the decentralized computing network is flat and decentralized; all nodes are entirely equal; global computation is completed by data interaction among the nodes in a decentralized manner; various management control strategies operating on the system are reflected and completed by the decentralized computation;

4. Rapid and friendly programming environment: The system constituted by the CPNs for the decentralized computing network provides an open user-friendly programming platform. The user can easily complete event/task definition by virtue of an operator/algorithm library provided by the system, and then the system can automatically compile a bottom program code, thereby realizing rapid software coding of the control management strategy, and having the advantage of agile development; furthermore, humongous application programs can be developed on the programming platform, with great compatibility and flexibility.

The invention claimed is:

1. A computing processing node (CPN) for a decentralized computing network, wherein:
   the CPN comprises a computer with information receiving, processing and transmitting functions, the CPN further includes a central processor, a memory, and a communication interface;
   a plurality of CPNs constitutes the decentralized computing network;
   each CPN only conducts data interaction with its topologically adjacent CPNs;
   each CPN has a spatial attribute embodied as an absolute spatial position where the CPN is located and/or a relative spatial position of the CPN in a topological network, wherein each CPN is associated with a basic space unit or an electromechanical equipment through a district control system which is configured to collect related information of the basic space unit or the electromechanical equipment or to control actuators associated with the basic space unit or the electromechanical equipment wherein the related information of the basic space unit or the electromechanical equipment is depicted in a form of a standard data sheet, and the standard data sheet constitutes a standard information set;
   each CPN is built-in with an operating system that provides an API interface, and demands and tasks of control and management associated with the basic space unit or the electromechanical equipment are transformed into a computation sequence through the API interface; and
   the computing sequence is jointly completed by the CPNs in the decentralized computing network in a decentralized and self-organized manner,
   wherein each CPN is configured to, based on at least the collected related information and input information of the computation sequence from adjacent nodes, complete local computation of a computing unit contained in the computing sequence, and transmit the computation result to adjacent nodes via the communication interface, and
   wherein a plurality of functional subnets are defined within the distributed computing network, each CPN is defined to be subordinate to at least one functional subnet based on an application of the district control system, and completes the tasks of control and management required for the at least one functional subnet by at least partly completing the local computation of the computing unit contained in the computation sequence.

2. The CPN according to claim 1, wherein the operating system supports parallel computation of a plurality of computation sequences.

3. The CPN according to claim 1, wherein each CPN automatically identifies, based on the standard information set, the certain basic space unit or the certain electromechanical equipment that is associated with the CPN, so as to realize plug and play of each CPN.

4. The CPN according to claim 1, wherein the operating system provides algorithm libraries at all levels from simple mathematical calculation to professional application algorithms; a user can invoke an algorithm in the algorithm libraries while writing the computation sequence; and the operating system automatically forms a bottom program code to realize agile programming.

5. The CPN according to claim 4, wherein
   an operator library includes: addition, subtraction, multiplication, division, weighted sum, quadrature, logical operation, maximizing, minimizing, set operation, spanning tree, Jacobi/gauss-seidel iteration, and other common basic mathematical operations;
   a basic algorithm library includes: a matrix calculation algorithm, a steepest descent method, a Newton's method, a genetic algorithm, a neuron algorithm, and other common basic mathematical algorithms; and
   an advanced algorithm library includes: a sensor fault diagnosis algorithm, a personnel distribution checking algorithm, a fire inversion algorithm, a region-based CFD algorithm, and other advanced algorithms applied to various professional fields.

6. The CPN according to claim 1, wherein the CPN has a plurality of communication interfaces, and the communication interfaces are divided into type A and type B;
   the CPN conducts data interaction with its topologically adjacent CPNs through the type A communication interfaces; and
   the CPN conducts data interaction with the district control system (DCS) through the type B communication interfaces.

7. The CPN according to claim 1, wherein a local naming way is applied when the CPN is accessed into the network, a name of the CPN differs from its topologically adjacent CPNs, and topologically non-adjacent CPNs have the same or different names.

8. The CPN according to claim 1, wherein the API interface is specifically an API interface based on a communication protocol or a common interface of other type.

9. The CPN according to claim 1, wherein
   the computation sequence includes a plurality of computation units, and the definition of the computation sequence includes the followings:
   a logical flow chart among the plurality of computation units; and
   an operator and/or an algorithm, an input variable, an output variable, and a computation flow and/or a step involved by each computation unit.

10. A decentralized computing network system, wherein the decentralized computing network system comprises:

a plurality of computing processing nodes (CPNs), each CPN comprises a computer with information receiving, processing and transmitting functions;

each CPN only conducts data interaction with its topologically adjacent CPNs; and each CPN has a spatial attribute embodied as an absolute spatial position where the CPN is located and/or a relative spatial position of the CPN in a topological network, wherein each CPN is associated with a basic space unit or an electromechanical equipment through a district control system (DCS), and the district control system is configured to collect related information of the basic space unit or the electromechanical equipment or to control actuators associated with the basic space unit or the electromechanical equipment wherein the related information of the basic space unit or the electromechanical equipment is depicted in a form of a standard data sheet, and the standard data sheet constitutes a standard information set; and the distributed computing network system is built-in with an operating system, and the operating system or at least a part of the operating system is distributed in each CPN;

the operating system provides an API interface, and control and management tasks associated with the basic space unit or the electromechanical equipment are transformed into a computation sequence through the API interface; and the computing sequence is jointly completed by the CPNs in the decentralized computing network system in a decentralized and self-organized manner, wherein each CPN is configured to, based on at least the collected related information and input information of the computation sequence from adjacent nodes, complete local computation of a computing unit contained in the computing sequence, and transmit the computation result to adjacent nodes, and wherein a plurality of functional subnets are defined within the distributed computing network system, each CPN is defined to be subordinate to at least one functional subnet based on an application of the district control system, and completes the control and management tasks required for the at least one functional subnet by at least partly completing the local computation of the computing unit contained in the computation sequence.

11. The system according to claim 10, wherein the operating system supports parallel computation of a plurality of computation sequences.

12. The system according to claim 10, wherein each CPN automatically identifies, based on the standard information set, the certain basic space unit or the electromechanical equipment that is associated with the CPN, so as to realize plug and play of each CPN.

13. The system according to claim 10, wherein the operating system provides algorithm libraries at all levels from simple mathematical calculation to professional application algorithms; a user can invoke the algorithm in the algorithm library while writing the computation sequence; and the operating system automatically forms a bottom program code to realize agile programming.

14. The system according to claim 13, wherein:

an operator library includes: addition, subtraction, multiplication, division, weighted sum, quadrature, logical operation, maximizing, minimizing, set operation, spanning tree, Jacobi/gauss-seidel iteration, and other common basic mathematical operations;

a basic algorithm library includes: a matrix calculation algorithm, a steepest descent method, a Newton's method, a genetic algorithm, a neuron algorithm, and other common basic mathematical algorithms; and an advanced algorithm library includes: a sensor fault diagnosis algorithm, a personnel distribution checking algorithm, a fire inversion algorithm, a region-based CFD algorithm, and other advanced algorithms applied to various professional fields.

15. The system according to claim 10, wherein each CPN has a plurality of communication interfaces, and the communication interfaces are divided into type A and type B;

each CPN conducts data interaction with its topologically adjacent CPNs through the type A communication interfaces; and each CPN conducts data interaction with the district control system (DCS) through the type B communication interfaces.

16. The system according to claim 10, wherein a local naming way is applied when each CPN is accessed into the network, a name of the CPN differs from its topologically adjacent CPNs, and topologically non-adjacent CPNs have the same or different names.

17. The system according to claim 10, wherein the API interface is specifically an API interface based on a communication protocol or a common interface of other type.

18. The system according to claim 10, wherein the computation sequence includes a plurality of computation units, and the definition of the computation sequence includes the followings:

a logical flow chart among the plurality of computation units; and an operator and/or an algorithm, an input variable, an output variable, and a computation flow and/or a step involved by each computation unit.

19. The system according to claim 10, wherein each CPN has the same structure, and the operating system embedded into each CPN are the same.

* * * * *